United States Patent
Liao

(10) Patent No.: US 8,307,137 B2
(45) Date of Patent: *Nov. 6, 2012

(54) REMOTE COMMUNICATION METHOD OF A NETWORK

(75) Inventor: Shu-Chun Liao, Taipei (TW)

(73) Assignee: Brainchild Electronic Co., Ltd., Taipei (TW)

( * ) Notice: Subject to any disclaimer, the term of this patent is extended or adjusted under 35 U.S.C. 154(b) by 1045 days.

This patent is subject to a terminal disclaimer.

(21) Appl. No.: 12/258,567

(22) Filed: Oct. 27, 2008

(65) Prior Publication Data

US 2010/0064194 A1    Mar. 11, 2010

(30) Foreign Application Priority Data

Sep. 8, 2008  (TW) ............................... 97134389 A

(51) Int. Cl.
G06F 13/00 (2006.01)
G06F 13/14 (2006.01)

(52) U.S. Cl. .................... 710/106; 710/104; 710/305

(58) Field of Classification Search ............ 710/3, 9–10, 710/38, 100, 104–106, 300, 305, 316
See application file for complete search history.

(56) References Cited

U.S. PATENT DOCUMENTS

| | | | | |
|---|---|---|---|---|
| 5,226,123 A | * | 7/1993 | Vockenhuber | 710/316 |
| 5,473,308 A | * | 12/1995 | Imaizumi | 340/506 |
| 5,835,790 A | * | 11/1998 | Nagai et al. | 710/61 |
| 5,862,405 A | * | 1/1999 | Fukuda et al. | 710/9 |
| 6,009,491 A | * | 12/1999 | Roppel et al. | 710/305 |
| 6,105,077 A | * | 8/2000 | Kimura | 710/9 |
| 6,745,270 B1 | * | 6/2004 | Barenys et al. | 710/104 |
| 6,775,726 B2 | * | 8/2004 | Chong | 710/104 |
| 6,834,321 B2 | * | 12/2004 | Yokoyama | 710/316 |
| 7,539,804 B2 | * | 5/2009 | Miura | 710/110 |
| 7,827,335 B2 | * | 11/2010 | Liao | 710/106 |

* cited by examiner

*Primary Examiner* — Paul R Myers
*Assistant Examiner* — Trisha Vu
(74) *Attorney, Agent, or Firm* — Chun-Ming Shih; HDLS IPR Services

(57) ABSTRACT

A remote communication method of a network includes a main controller and a plurality of control units, wherein each control unit is serially connected to the main controller and the control unit at next stage through a transmission terminal and a transmitter. Each control unit receives the data sent from the main controller and identifies the received data as one of a first, a second and a third packet. If it is the first packet and the main controller attempts to read data from each control unit, a switch in the control unit is turned on and a response data is transmitted to the main controller. If it is the second packet and a connection index is equal to a target unit address, then data is written to a corresponding single control unit. If it is the third packet and a target unit address is zero, data is written to all control units.

11 Claims, 5 Drawing Sheets

| first frame K | second frame | third frame | current | voltage | alarm | ... | last two frames | last two frames |
|---|---|---|---|---|---|---|---|---|
| 41 | 42 | 43 | | | | | 44 | 45 |

FIG.3 (4)

| first frame K+1 | second frame | third frame | current | voltage | alarm | ... | last two frames | last two frames |
|---|---|---|---|---|---|---|---|---|
| 51 | 52 | 53 | | | | | 54 | 55 |

FIG.4 (5)

REMOTE COMMUNICATION METHOD OF A NETWORK

BACKGROUND OF THE INVENTION

1. Field of the Invention

The present invention relates to a remote communication method, especially a remote communication method that remotely executes data read/write of all control units through a network.

2. Description of Prior Art

Recent communication port structures are categorized into parallel port and serial port. Theoretically the transmission speed of serial port is slower than that of parallel port; however, serial port is widely used in consumer products, electronic products, industrial products and communication products because of its simple structure, easy connection, long transmission distance, high noise immunity and low cost. Especially in industrial environment, serial port is the best choice for connecting numerous remote control units to a network, and the mostly used function block is universal asynchronous receiver/transmitter (UART). UART transmits digital data at a fixed Baud rate and defines data frames with a start bit and a stop bit. A parity bit can be added to increase the reliability of transmission. Therefore, transmitting an 8-bit data requires 11 bit time units, including start bit, stop bit and parity bit.

FIG. 1 shows a traditional connecting method and system of a serial port using universal asynchronous receiver/transmitter (UART). The system comprises a plurality of control units 10. Each control unit 10 includes an analog/digital converter 20 and a microcontroller 30 with a universal asynchronous receiver/transmitter (UART) 301 therein. The universal asynchronous receiver/transmitter (UART) contains a receiver 302 and a transmitter 303. The feature of this connecting method and system is that all the receivers 302 of control units 10 on the same network are connected with the transmission terminal 40 to form a common receiving node. The transmitters 303 connect to the response terminal 50 and form a common transmitting node. When transmission terminal 40 sends a signal, all control units 10 receives this signal simultaneously. Therefore, each control unit 10 must have a unique and non-repeating address and the received message frames must include at least one byte of address information for calling a corresponding control unit 10. Then the control unit 10 being called starts to execute the command it receives, and sends a response message to the common transmitting node. Other control units 10 must turn off their transmitters to prevent from signal collision if more than one signals are sharing the transmission terminal 40.

The technique described above is widely used in the products those execute remote control through the network, especially those using RS-485, RS-422 or other similar standard interfaces or communication protocols to implement the communication function of the system. These communication methods are simple but with the following drawbacks:

1. Each control unit in the same system must set a fixed and non-repeating address. It is very inconvenient when building and maintaining a system. The communication function fails if the address information is altered intentionally during usage, increasing the loading of managing the system.

2. Only one control unit is allowed to respond at one time, hence signals have to be send individually to each control unit. The communication efficiency drops with an increase in the number of control units in a system.

SUMMARY OF THE INVENTION

The object of the present invention is to provide a new connecting method for remote control units, such that the control units form a network by serially connecting to each other for executing data collecting, remote monitoring, data downloading and system building between the main controller and the control units.

The present invention provides a remote communication method of a network, comprising: using each control unit to receive data sent from the main controller; determining whether the received data is one of a first, a second or a third packet; turning on the switch by the microcontroller in each control unit and transmitting a response data to the main controller if the received data is identified as the first packet and the main controller attempts to read data from each control unit; executing data write to a corresponding single control unit if the microcontroller identifies the received data as the second packet, and immediately executing data write if a connection index and a target unit address within the second packet are equal; and, executing data write to all control units if the microcontroller identifies the received data as the third packet, and executing data write at any control unit if a target unit address within the third packet is zero.

BRIEF DESCRIPTION OF THE DRAWINGS

FIG. 3 is a diagram showing the transmission packet of the main controller for reading the data of each unit according to the invention FIG. 4 is a diagram showing the response packet returned by the control unit according to the invention.

DETAILED DESCRIPTION OF THE INVENTION

Figure 1:
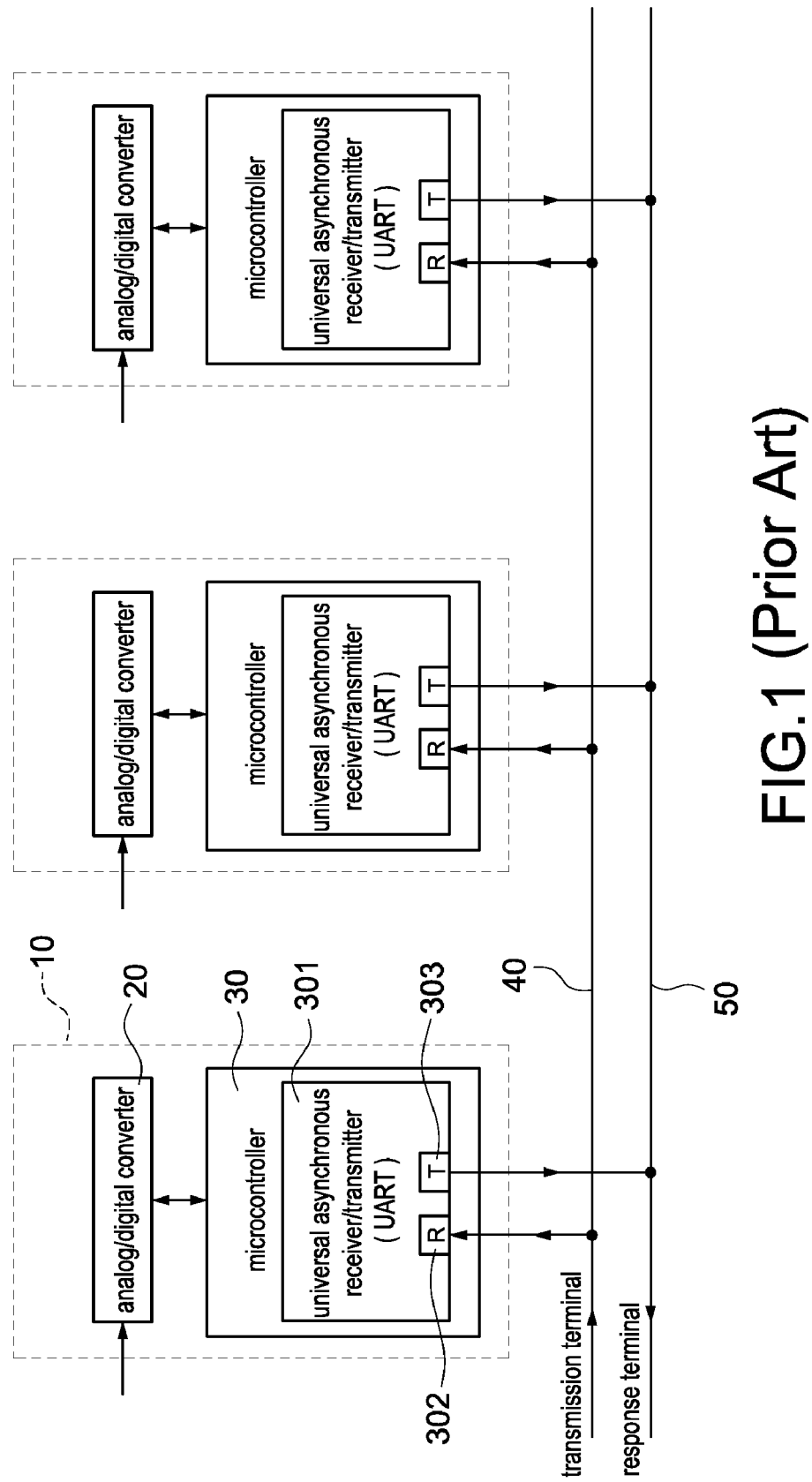
FIG. 1 is a diagram showing a traditional connecting method and system of a serial port using universal asynchronous receiver/transmitter (UART).
Figure 2:
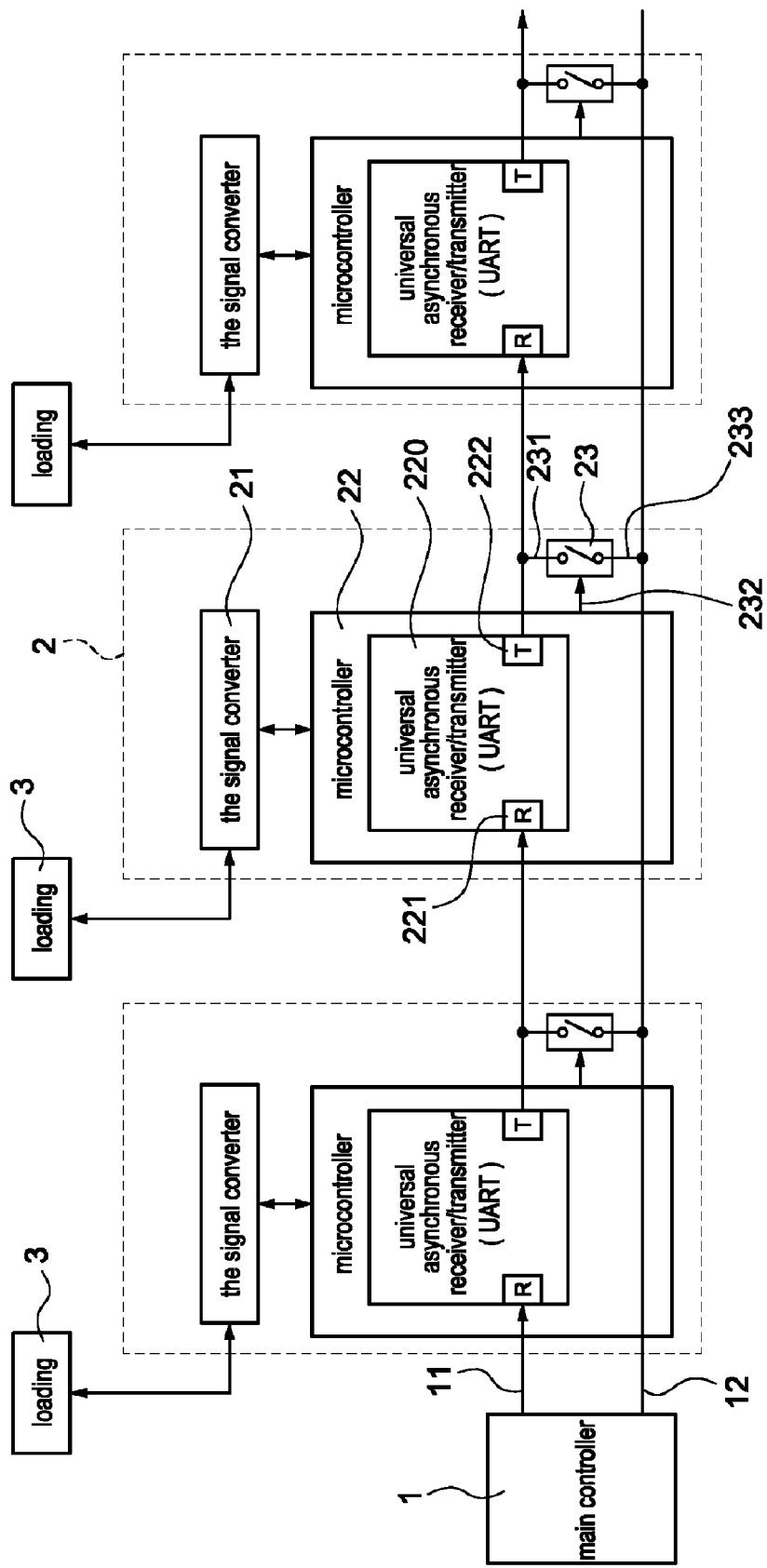
FIG. 2 is a block diagram showing the electrical connection of the remote communication system according to the invention.

FIG. 2 is a block diagram showing the electrical connection of the remote communication system according to the invention. The remote control system of the invention comprises a main controller 1 and a plurality of control units 2, wherein each control unit 2 serially connects to the main controller 1 and a control unit 2 at next stage through a network. The control unit 2 includes at least one signal converter 21, a microcontroller 22 and a switch 23.

The signal converter 21 is an analog/digital converter, electrically connecting to an external loading 3 for receiving the signals from the loading 3 and transmitting control signals to the loading 3. In this figure, the loading 3 is an alarm or a current, voltage or temperature sensor.

The microcontroller 22 is electrically connected with the signal converter 21 in order to receive the signals from the signals converter 21 and transmit control signals to the signal converter 21. The microcontroller at least includes a universal asynchronous receiver/transmitter (UART) 220. The universal asynchronous receiver/transmitter 220 contains a receiver 221 and a transmitter 222. The receiver 221 is electrically connected to a transmission terminal 11 set in the main controller 1, or to a transmitter 222 of a universal asynchronous receiver/transmitter 220 at previous stage. The transmitter 222 is electrically connected to a receiver 221 of a universal asynchronous receiver/transmitter 220 at next stage.

The switch 23 has a first input port 231, a second input port 232 and an output port 233. The first input port 231 electrically connects with the transmitter 222 of the universal asynchronous receiver/transmitter 220. The second input port 232 electrically connects to the microcontroller 22. The output port 233 is electrically connected to a response terminal 12 in the main controller 1. After the main controller 1 sends signals to every control units 2, the microcontroller 22 turns on the switch 23 if a response signal is required. The signal sent from the transmitter 222 of the universal asynchronous receiver/transmitter 220 travels to the response terminal 12 through the switch 23, and is received by the main controller 1 through the response terminal 12.

Under this serial connection mode, the main controller 1 automatically locates and accesses the data from every unit with only one command instead of calling each unit one at a time. The communication efficiency is increased accordingly.

FIG. 2 and FIG. 3 are block diagrams showing the electrical connection of the remote communication system and the transmission packet of the main controller for reading the data of every unit according to the invention. As shown in the figure, the main controller 1 sends a first packet 4 through the transmission terminal 11 when the main controller 1 attempts to read the data of all units. The first frame 41 of the first packet 4 is connection index and it sets the address of each unit. The second frame 42 is function code and is for the control unit 2 to decide whether to read or write date. The frames after the third frame 43 are parameters (for example, temperature, alarm, current, and voltage) related to the control unit 2 and the loading 3 it externally connects to. The last two frames 44 and 45 are the first error correcting code and the second error correcting code, correspondingly.

After the main controller 1 transmits the first packet 4 through transmission terminal 11 and a receiver 221 of the first control unit 2 receives the data, the microcontroller 22 sets the address of the first control unit 2 to k according to the connection index, k, in the first frame 41. Next, the microcontroller 22 sets the connection index to k+1 and passes the first packet 4 to the next control unit 2 through the transmitter 222. Hence, the address of the second control unit 2 is k+1, and the address setting of all the following units is completed in this manner. If one of the control units 2 is removed or updated, all control units automatically process the addressing function once a signal is sent from the main controller 1.

When the microcontroller 22 of the first control unit 2 identifies the function code of the second frame 42 and first error correcting code and the second error correcting code of the last two frames 44 and 45 as the first packet 4 transmitted from the main controller 1, the microcontroller 22 of the first control unit 2 turns on the switch 23 and the data stored in an internal register or memory (not shown in the figure) of the microcontroller 22 is transmitted by the transmitter 222 to the response terminal 12 through the switch 23, and is received by the main controller 1 through the response terminal 12.

FIG. 2 and FIG. 4 are block diagrams showing the electrical connection of the remote communication system and the response packet responded by the control unit according to the invention. As shown in the figure, the main controller 1 receives the response packet 5 returned from each control unit 2 through the response terminal 12. The main controller 1 determines which control unit 2 responded and whether the data is correct according to the first frame 51, the second frame 52 and the first error correcting code and the second error correcting code at the last two frames 54 and 55 of the response packet 5. Once approved, the main controller 1 reads the data contained in the response packet 5 returned by the control unit 2, for example, the third frame 53 and the parameters after the third frame 53 (temperature, alarm, current and voltage).

Figure 5:
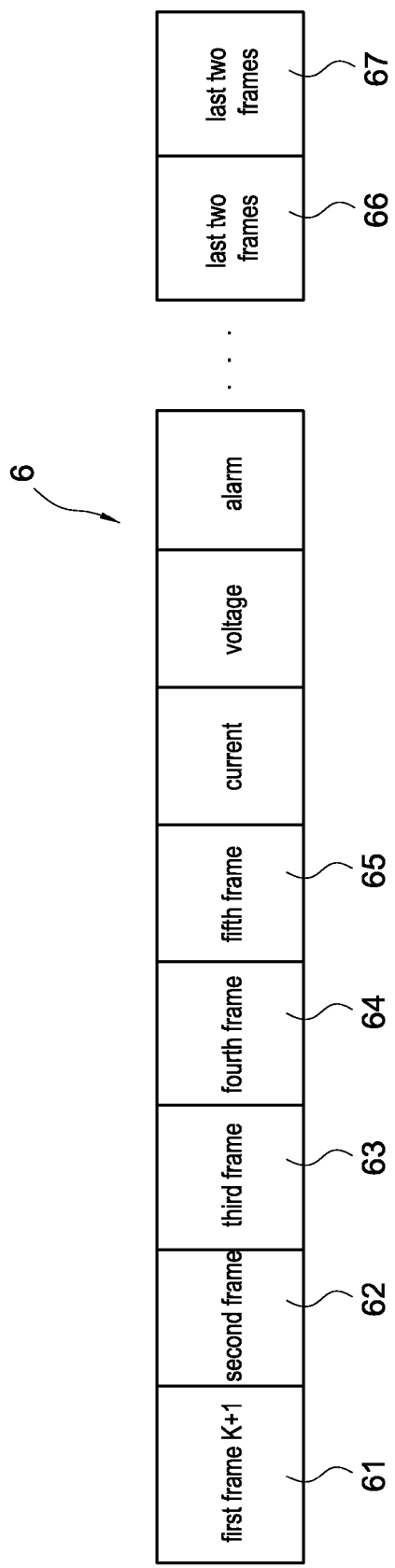
FIG. 5 is a diagram showing a write packet the main controller transmitted to a single control unit according to the invention

Please refer to FIG. 5, which is a diagram showing a write packet the main controller transmitted to a single control unit according to the invention. When the main controller 1 attempts to write data into the third control unit 2, the first frame 61 of the second packet 6 is connection index k+1, the second frame 62 is function code, and the third frame 63 is the target unit address. When the connection index k+1 of the first frame 61 equals the target unit address in the third frame 63, write function activates and data is written into the microcontroller 22 according to the fourth frame 64, which is the register starting address. For example, the fourth frame 64 with a register starting address of (5) means writing data into the fifth register inside the microcontroller 22. The data in the fifth frame 65 and those after the fifth frame 65 will be written into the register.

Furthermore, the first error correcting code and the second error correcting code at the last two frames 66 and 67 of the second packet 6 are used for determining whether the data is transmitted from the main controller 1 before the data is being written.

Figure 6:
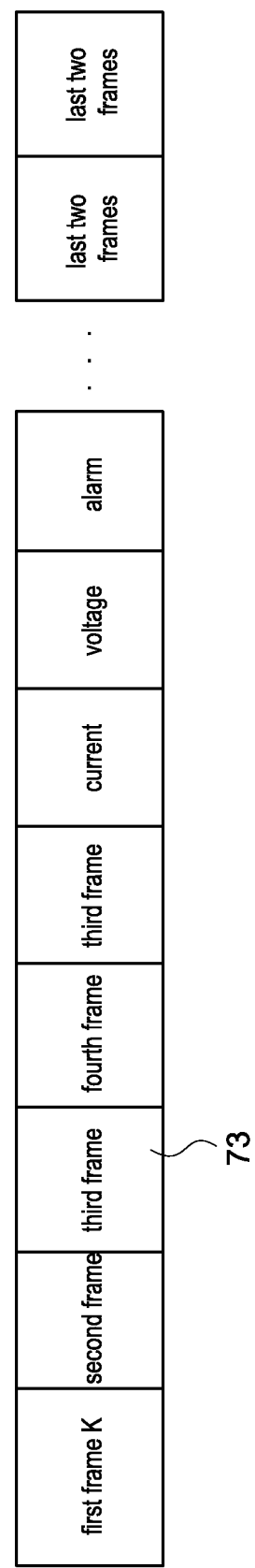
FIG. 6 is a diagram showing a write packet the main controller transmitted to all control units according to the invention.

FIG. 6 demonstrates a diagram of a write packet the main controller transmitted to all control units according to the invention. The third packet 7 disclosed in the figure is mostly similar to that in FIG. 5. The difference is that the target unit address in the third frame 63 of the second packet 6 is a fixed address while that in the third frame 73 of the third packet 7 is (0), which means all control unit 2 will process data write.

Figure 7:
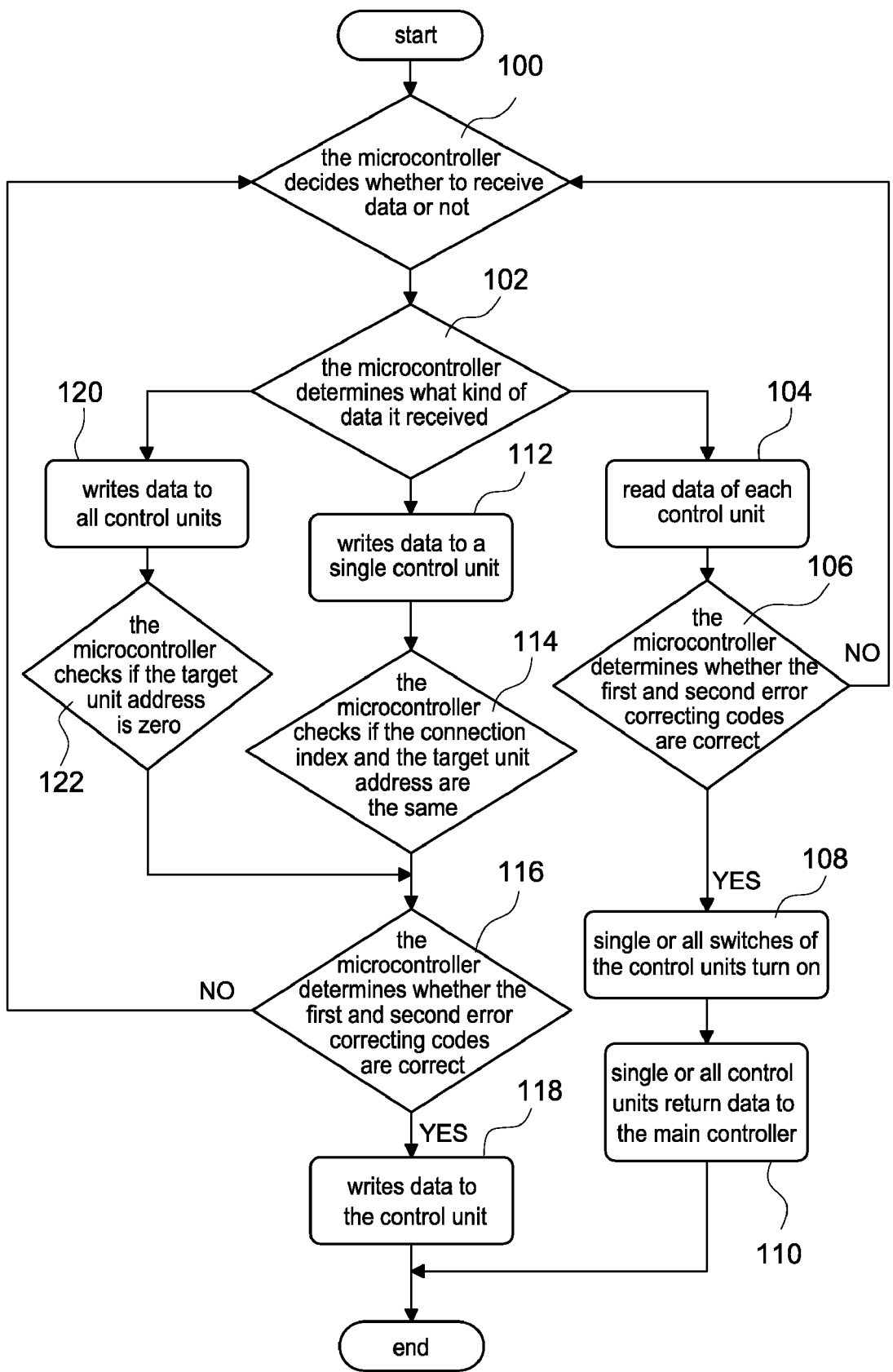
FIG. 7 is a flow chart showing the communication method for the main controller and all control units according to the remote communication system of the invention.

FIG. 7 is a flow chart showing the communication method for the main controller and all control units according to the remote communication system of the invention. First, in step 100, the microcontroller determines whether receiving the data.

If the microcontroller decides to receive the data, then it enters step 102 and decides what kind of packet data it is. If the microcontroller identifies the data as the first packet, it moves on to step 104 and read the data of each control unit.

At step 106, each control unit judges the correctness of the first and the second error correcting code transmitted from the main controller. If the first and second error correcting codes are not correct, it moves back to step 100. If the first and second error correcting codes are correct, it first enters step 108 and turns on the switch of each control unit, then further enters step 110 where each control unit returns data to the main controller.

At step 102, if the microcontroller identifies the data as the second packet, it moves on to step 112 and writes data to a single control unit. Next, entering step 114 and the microcontroller checks the connection index and the target unit address. If they are not the same, no write action will be processed. If the connection index and the target unit address are equal, then it enters step 116 and the microcontroller judges the correctness of the first and the second error correcting code. If they are not correct, it moves back to step 100. If the first and second error correcting codes are correct, it enters step 118 and data is written into the control unit. At step 102, if the microcontroller identifies the data as the third packet, it enters step 120 and writes data to all control units. Next, entering step 122 and the microcontroller checks if the target unit address is (0). If it is not zero, all control units will not write data. If the target unit is zero, every control unit 2 writes data and enters step 116 and the microcontroller judges the correctness of the first and the second error correcting code. If they are not correct, it moves back to step 100. If the first and second error correcting codes are correct, it enters step 118 and data is written into the control unit. Please note that the above embodiment is merely exemplary illustration of the present invention, those skilled in the art can certainly make appropriate modifications according to practical demands, which also belongs to the scope of the present invention.

What is claimed is:

1. A remote communication method of a network, comprising a plurality of control units electrically connected to a plurality of external loadings, each of the control unit comprising a signal converter, a microcontroller and a switch, wherein the microcontroller comprises a universal asynchronous receiver/transmitter electrically and serially connected to the switch, a transmission terminal of a main controller through a receiver and a transmitter therein, the method comprising:

using each control unit to receive data sent from the main controller and determining whether the received data is a first, a second or a third packet with the microcontroller in the control unit;

turning on the switch by the microcontroller in the control unit and transmitting a response data to the main controller if the received data is identified as the first packet and the main controller attempts to read data from each control unit;

executing data write to a corresponding single control unit if the microcontroller identifies the received data as the second packet, and immediately executing data write if a connection index and a target unit address within the second packet are equal; and, executing data write to all control units if the microcontroller identifies the received data as the third packet, and executing data write at any control unit if a target unit address within the third packet is zero.

2. The remote communication method as claimed in claim 1, wherein the signal converter is an analog/digital converter.

3. The remote communication method as claimed in claim 1, wherein the loading is either an alarm or a current, voltage or temperature sensor.

4. The remote communication method as claimed in claim 1, wherein the first packet comprises a connection index, a function code, parameters of the loading, a first error correcting code and a second error correcting code.

5. The remote communication method as claimed in claim 4, wherein the microcontroller of the control unit sets the address of the control unit to k if the connection index received is k, and changes the connection index to k−1 then passes it to the next control unit.

6. The remote communication method as claimed in claim 1, wherein the response packet comprises a connection index, a function code, parameters of the loading, a first error correcting code and a second error correcting code.

7. The remote communication method as claimed in claim 6, wherein the main controller determines whether the data is correct according to the first and second error correcting code after receiving the response packet.

8. The remote communication method as claimed in claim 1, wherein the data being written is the parameters of the loading.

9. The remote communication method as claimed in claim 8, wherein the parameters are written to the internal register or memory of the microcontroller.

10. The remote communication method as claimed in claim 1, wherein the first packet or the second packet comprises a connection index, a function code, target unit address, starting address of the register, parameters of the loading, a first error correcting code and a second error correcting code.

11. The remote communication method as claimed in claim 1, wherein the microcontroller is configured to check the correctness of a first and second error correcting codes within the first, second or third packet when it receives the first, second or third packet, if the first and second error correcting codes are correct, the microcontroller receives the first, second or the third packet transmitted from the main controller.

* * * * *